United States Patent [19]

Yoshimi et al.

[11] Patent Number: 5,325,196
[45] Date of Patent: Jun. 28, 1994

[54] TELEVISION RECEIVER

[75] Inventors: Osamu Yoshimi; Yoshikazu Shimizu; Kunio Aiyama, all of Osaka, Japan

[73] Assignee: Matsushita Electric Industrial Co., Ltd., Osaka, Japan

[21] Appl. No.: 729,125

[22] Filed: Jul. 12, 1991

[30] Foreign Application Priority Data

Jul. 23, 1990 [JP] Japan ............... 2-195362

[51] Int. Cl.$^5$ ............... H04N 17/00; H04N 17/04
[52] U.S. Cl. ............... 348/190; 348/180
[58] Field of Search ............... 358/188, 190, 194.1, 358/21 R, 139, 10; 455/186, 343; H04N 17/00, 17/02, 17/04

[56] References Cited

U.S. PATENT DOCUMENTS

| | | | |
|---|---|---|---|
| 3,959,811 | 5/1976 | Shanley, II | 358/10 |
| 4,626,892 | 12/1986 | Nortrup et al. | 358/188 |
| 4,654,706 | 3/1987 | Davidson et al. | 358/139 |
| 4,706,102 | 11/1987 | Kumagai et al. | 358/10 |
| 4,731,654 | 3/1988 | Habashi et al. | 358/188 |
| 4,769,703 | 9/1988 | Osborne et al. | 358/139 |
| 4,858,006 | 8/1989 | Suzuki et al. | 358/10 |
| 4,901,147 | 2/1990 | Taijma et al. | 358/10 |
| 5,099,326 | 3/1992 | Hakamada et al. | 358/10 |

FOREIGN PATENT DOCUMENTS

0178844 4/1986 European Pat. Off. .

OTHER PUBLICATIONS

IEEE Transactions on Consumer Electronics, vol. 34, No. 3, Aug. 1988, New York US, pp. 807-812, J. Saitoh et al 'A New TV Receiver'.

*Primary Examiner*—James J. Groody
*Assistant Examiner*—Michael H. Lee
*Attorney, Agent, or Firm*—Lowe, Price, LeBlanc & Becker

[57] ABSTRACT

A television receiver includes a mode setting device for selectively setting either a factory check mode of operation or a normal mode of operation. Speeds of variation of adjustment sections of the television receivers are set at predetermined high speeds in the factory check mode, and are set at predetermined normal speeds in the normal mode. The television receiver also includes an input device for inputting a control signal, and a control device for controlling the mode setting device in response to the control signal.

10 Claims, 5 Drawing Sheets

TELEVISION RECEIVER

BACKGROUND OF THE INVENTION

1. Field of the Invention

This invention relates to a television receiver.

2. Description of the Prior Art

Recently, television receivers with various additional functions have been developed. A final stage of the production of such multi-function television receivers requires many steps for adjustment and check. It is good to reduce the number of these steps for an efficient production of multi-function television receivers.

SUMMARY OF THE INVENTION

It is an object of this invention to provide a television receiver which can be produced efficiently.

A first aspect of this invention provides a television receiver comprising mode setting means for selectively setting either a factory check mode of operation or a normal mode of operation, wherein speeds of variation of adjustment sections of the television receivers are set at predetermined high speeds in the factory check mode and are set at predetermined normal speeds in the normal mode; input means for inputting a control signal; and means for controlling the mode setting means in response to the control signal.

A second aspect of this invention provides an apparatus for producing a television receiver provided with mode setting means for setting a mode of operation in response to a control signal, the apparatus comprising means for adjusting and checking adjustment sections of the television receiver in respective steps; and control signal output means for feeding a control signal to the mode setting means for each of the steps; wherein the control signal output means comprises means for feeding a control signal to the mode setting means and enabling the mode setting means to set a normal mode of operation when a final step of the steps is completed.

A third aspect of this invention provides a television receiver comprising a receiving circuit having adjustment sections; control means for controlling the adjustment sections of the receiving circuit to adjust and check the adjustment sections of the receiving circuit; memory means for storing data determining control modes of the control means; input means for inputting a signal for designating the control-mode determining data in the memory means to control the adjustment sections of the receiving circuit; and display means for indicating information representing a designated control mode and also information representing results of adjustment by the control mode.

A fourth aspect of this invention provides a television receiver comprising a nonvolatile memory; means for reading out data from the nonvolatile memory; means for changing adjustment conditions of adjustment sections of the television receiver between first adjustment conditions and second adjustment conditions; means for controlling the changing means; a power supply, and means for turning on the power supply when the data of the nonvolatile memory represents one of the first adjustment conditions and the second adjustment conditions.

A fifth aspect of this invention provides a method of producing a television receiver provided with a remote-control receiver for receiving control signals, the method comprising a plurality of adjustment and check steps, wherein different remote-control transmitters for transmitting control signals to the remote-control receiver are used for the steps respectively.

A sixth aspect of this invention provides a television receiver comprising a nonvolatile memory storing changeable data which selectively corresponds to one of a factory check mode, a normal mode, and an ageing mode; means for reading out the data from the nonvolatile memory; means for operating adjustment sections of the television receiver in one of the factory check mode, the normal mode, and the ageing mode in accordance with the data read out from the non-volatile memory; means for continuing adjustment sections of the television receiver to operate in a current mode in the absence of a control signal: means for changing operation of the adjustment sections of the television receiver from the ageing mode to the factory check mode when the control signal is inputted; and means for changing the data in the nonvolatile memory so as to correspond to the normal mode and replacing the factory mode by the normal mode when a shipment setting signal is inputted.

A seventh aspect of this invention provides a television receiver comprising a power supply; a nonvolatile memory; a RAM; setting mode judgment means for transferring data from the nonvolatile memory to the RAM and judging whether or not a mode setting of the television receiver is a factory check mode on the basis of the transferred data when the power supply is turned on; operating condition setting means for setting an operating condition in accordance with a result of the judging by the setting mode judgment means; input signal judgment means for, after the operating condition setting means sets the operating condition, judging whether or not a control signal is inputted; means for, in cases where the input signal judgment means judges that the control signal is not inputted, continuing a current mode; a display device; ageing mode judgment means for, in cases where the input signal judgment means judges that the control signal is inputted, judging whether or not operation of the display device is in an ageing mode; changing means for, in cases where the ageing mode judgment means judges that the operation of the display device is in the ageing mode, replacing the ageing mode by the factory check mode; factory check mode judgment means for, after the ageing mode judgment means judges whether or not the operation of the display device is in the ageing mode, judging whether the factor check mode or a normal mode is currently present; shipment setting signal judgment means for, in cases where the factory check mode judgment means judges that the factory check mode is currently present, judging whether or not a shipment setting signal is inputted; and means for, in cases where the shipment setting signal judgment means judges that the shipment setting signal is inputted, replacing the factory check mode by the normal mode.

An eighth aspect of this invention provides a television receiver comprising a variable adjustment section which can operate in either a high-speed mode or a normal-speed mode, wherein a speed of a variation of the adjustment section in the high-speed mode of operation is higher than a speed of a variation of the adjustment section in the normal-speed mode of operation; a manual switch having a changeable state; and means for changing operation of the adjustment section between the high-speed mode and the normal-speed mode in response to the state of the manual switch.

A ninth aspect of this invention provides a television receiver comprising a variable adjustment section which can operate in either a high-speed mode or a normal-speed mode, wherein a speed of a variation of the adjustment section in the high-speed mode of operation is higher than a speed of a variation of the adjustment section in the normal-speed mode of operation; a nonvolatile memory for storing changeable mode data representing either the high-speed mode or the normal-speed mode; means for deciding whether or not the mode data in the nonvolatile memory represents the high-speed mode; and means for changing operation of the adjustment section between the high-speed mode and the normal-speed mode in response to a result of said deciding by said deciding means.

A tenth aspect of this invention provides a television receiver comprising a variable adjustment section which can operate in either a high-speed mode or a normal-speed mode, wherein a speed of a variation of the adjustment section in the high-speed mode of operation is higher than a speed of a variation of the adjustment section in the normal-speed mode of operation; a nonvolatile memory for storing changeable mode data representing either the high-speed mode or the normal-speed mode, the mode data initially representing the high-speed mode; means for initially setting operation of the adjustment section into the high-speed mode; means for detecting whether or not a shipment setting signal is inputted; means for changing the operation of the adjustment section from the high-speed mode to the normal-speed mode when said detecting means detects that a shipment setting signal is inputted; means for changing the mode data in the nonvolatile memory so as to represent the normal-speed mode when said detecting means detects that a shipment setting signal is inputted; means for deciding whether or not the mode data in the nonvolatile memory represents the high-speed mode; and means for continuing the normal-speed mode of the operation of the adjustment section when said deciding means decides that the mode data in the nonvolatile memory does not represent the high-speed mode.

DESCRIPTION OF THE FIRST PREFERRED EMBODIMENT

Figure 1:
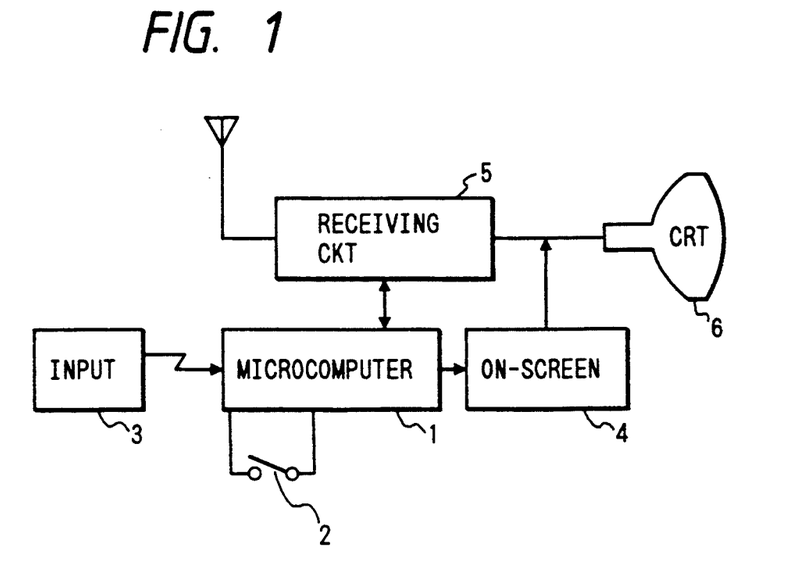
FIG. 1 is a block diagram of a television receiver according to a first embodiment of this invention.

With reference to FIG. 1, a television receiver includes a microcomputer 1, a factory check mode switch 2, an input device 3, an on-screen device 4, a usual television receiving circuit 5, and a cathode-ray tube (CRT) 6.

The microcomputer 1 is connected to the factory check mode switch 2, the input device 3, the on-screen device 4, and the television receiving circuit 5. The on-screen device 4 is connected to the CRT 6. Also, the television receiving circuit 5 is connected to the CRT 6.

The input device 3 includes a remote-control input device and an input keyboard. Various instruction signals can be inputted into the microcomputer 1 by operating the input device 3. The microcomputer 1 can output image information to the on-screen device 4. The on-screen device 4 generates an RGB video signal in response to the received image information and feeds the RGB video signal to the CRT 6 so that the image information can be visualized on the CRT 6.

The microcomputer 1 includes a combination of a CPU, a RAM, a ROM, and an I/O port. The microcomputer 1 operates in accordance with a program stored in the ROM. The program is designed so that the microcomputer 1 can execute processes indicated later.

The factory check mode switch 2 is of the manually-operated type, being changeable between an on position and an off position. The microcomputer 1 always monitors the position of the factory check mode switch 2. When the microcomputer 1 detects that the factory check mode switch 2 assumes the on position, the microcomputer 1 sets a quick mode of operation of the television receiver in which electronic control volumes such as a sound control volume and a brightness control volume can be varied at higher speeds than normal. The higher variation speeds enable faster check and adjustment of the television receiver.

During check and adjustment stages of the production of the television receiver in a factory, the factory check mode switch 2 is changed to the on state so that the microcomputer 1 sets the television receiver into the quick mode of operation. During the quick mode of operation, when an instruction signal for brightness adjustment is inputted into the microcomputer 1 via the input device 3, the microcomputer 1 generates brightness control signals and brightness test signals and feeds the brightness control signals and the brightness test signals to the television receiving circuit 5. As a result, brightness check and brightness adjustment of the television receiving circuit 5 are enabled. When an instruction signal for self-diagnosis is inputted into the microcomputer 1 via the input device 3, the microcomputer 1 checks various adjustment sections of the television receiving circuit 5 and generates image information representative of the results of the check. The microcomputer 1 outputs the image information to the on-screen device 4. The on-screen device 4 generates an RGB video signal in response to the received image information and feeds the RGB video signal to the CRT 6, so that the results of the check are visualized on the CRT 6. When the check and adjustment stages of the production of the television receiver are completed, the factory check mode switch 2 is changed to the off state. Then, the factory check mode switch 2 may be removed from the television receiver.

DESCRIPTION OF THE SECOND PREFERRED EMBODIMENT

Figure 2:
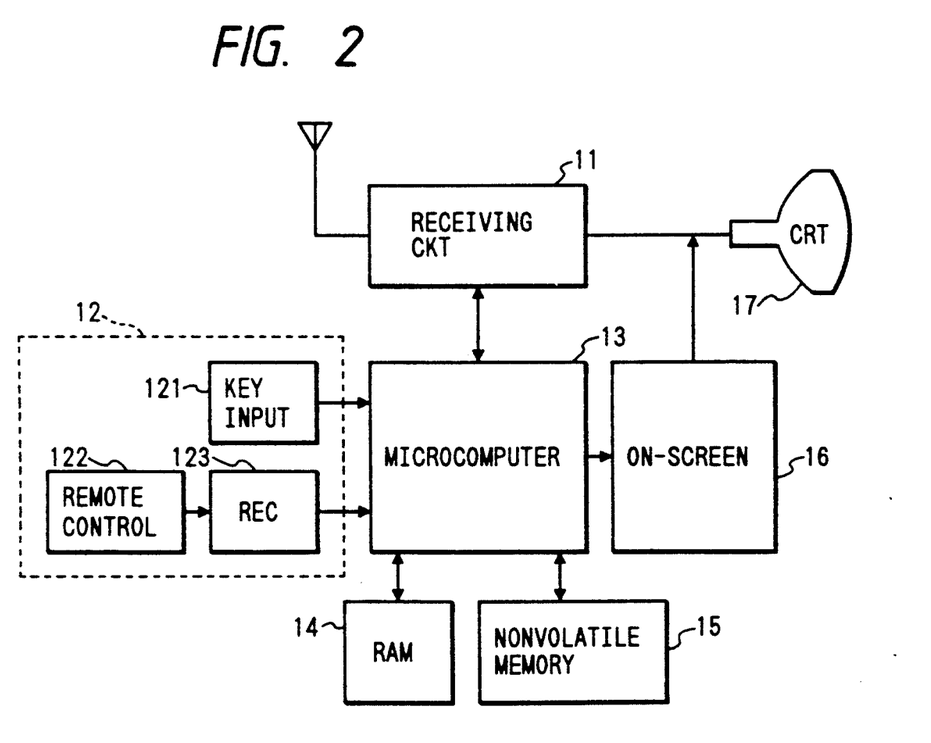
FIG. 2 is a block diagram of a television receiver according to a second embodiment of this invention.

With reference to FIG. 2, a television receiver includes a usual television receiving circuit 11, an input device 12, a microcomputer main section 13, a RAM 14, a nonvolatile memory 15, an on-screen device 16, and a cathode-ray tube (CRT) 17.

The microcomputer main section 13 includes a CPU, a ROM, and an I/O port. The microcomputer main section 13, the RAM 14, and the nonvolatile memory 15 are connected to compose a microcomputer. The microcomputer main section 13 is also connected to the television receiving circuit 1 1, the input device 12, and the on-screen device 16. The on-screen device 16 is connected to the CRT 17. Also, the television receiving circuit 11 is connected to the CRT 17.

The input device 12 includes a keyboard 121 and a pair of a remote-control transmitter 122 and a remote-control receiver 123. Various instruction signals can be inputted into the microcomputer main section 13 by operating the input device 12. The nonvolatile memory 15 stores 1-bit data for representing either a factory mode or a normal mode. The 1-bit mode data is initially set so as to represent the factory mode. In addition, the nonvolatile memory 15 stores various information data and reference data which are changed in response to a change between the factory mode and the normal mode. The various information data and the reference data are initially set so as to correspond to the factory mode. The microcomputer main section 13 can output image information to the on-screen device 16. The on-screen device 16 generates an RGB video signal in response to the received image information and feeds the RGB video signal to the CRT 17 so that the image information can be visualized on the CRT 17.

Figure 3:
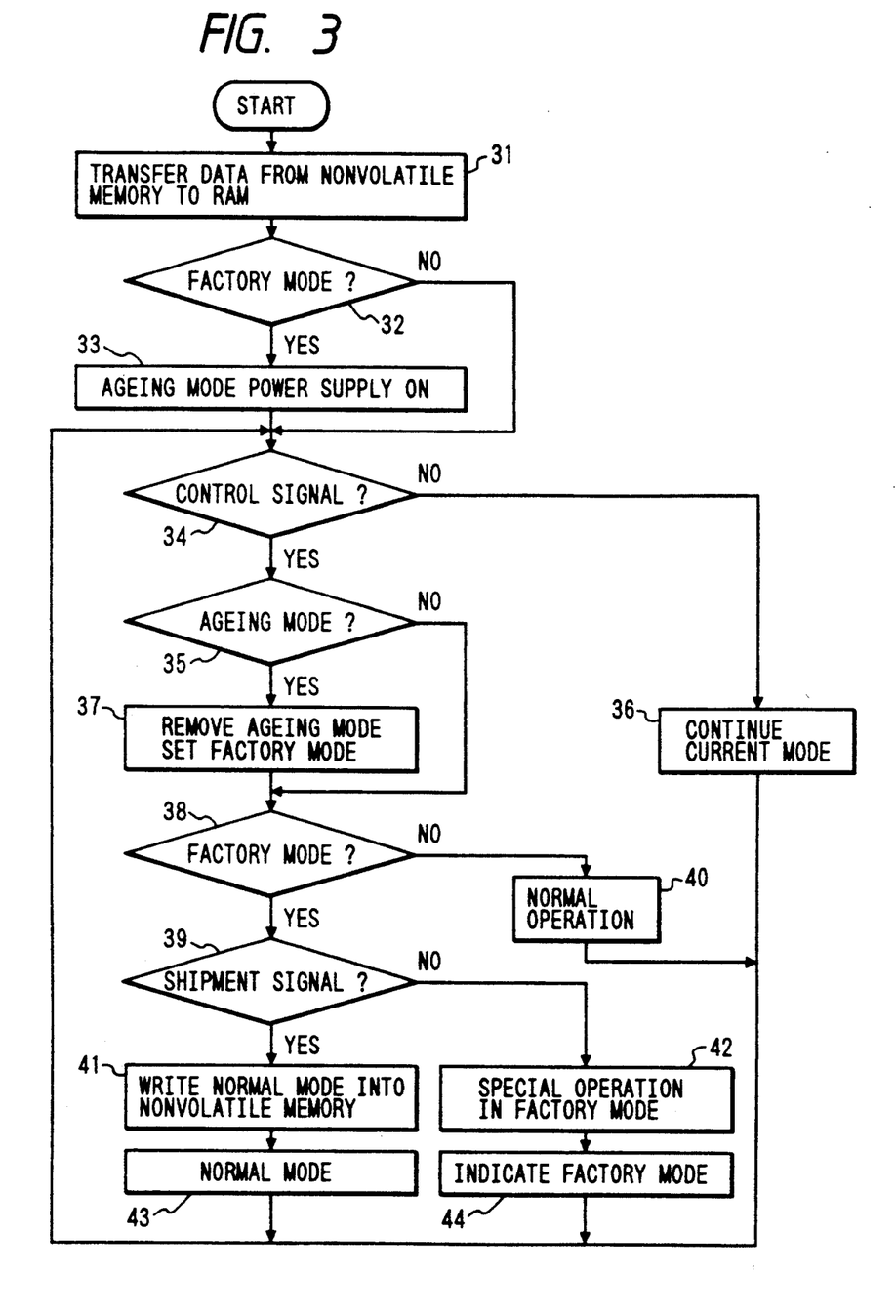
FIG. 3 is a flowchart of a program operating the microcomputor of FIG. 2.

The microcomputer main section 13 operates in accordance with a program stored in the internal ROM. When a power supply switch (not shown) leading to the microcomputer is changed to an on position, the microcomputer is reset and then the microcomputer starts to execute the program. FIG. 3 is a flowchart of the program.

As shown in FIG. 3, a first step 31 of the program reads out the 1-bit mode data, the various information data, and the reference data from the nonvolatile memory 15, and stores all the readout data into the RAM 14.

A step 32 following the step 31 decides whether or not the 1-bit mode data represents a factory mode. When the 1-bit mode data represents a factory mode, the program advances to a step 33. Otherwise, the program jumps to a step 34.

The step 33 changes a main power supply relay switch (not shown) of the television receiver to an on position, so that all the sections of the television receiver are activated. In addition, the step 33 controls the on-screen device 16 so that a reference image will be indicated on the CRT 17 and that the CRT 17 and other sections of the television receiver wt be set into an ageing state (an ageing mode of operation). After the step 33, the program advances to the step 34.

The step 34 decides whether or not an instruction signal for adjustment and check is inputted from the input device 12. When an instruction signal for adjustment and check is inputted from the input device 12, the program advances to a step 35. Otherwise, the program advances to a step 36 which continues the current mode of operation. After the step 36, the program returns to the step 34. Thus, the steps 34 and 36 are reiterated until an instruction signal for adjustment and check is inputted.

The step 35 decides whether or not the CRT 17 and other sections of the television receiver are in the ageing mode of operation. When the CRT 17 and other sections of the television receiver are in the ageing mode of operation, the program advances to a step 37. Otherwise, the program jumps to a step 38.

The step 37 controls the on-screen device 16 so that the operation of the CRT 17 will be changed from the ageing mode to a factory mode. In addition, the step 37 changes the operation of the television receiving circuit 1 I into a factory mode. While the CRT 17 and other sections of the television receiver are in the factory mode, higher control speeds can be attained and special processes of checking and adjusting the television receiver can be executed. After the step 37, the program advances to the step 38.

The step 38 decides whether or not the 1-bit mode data represents the factory mode. When the 1-bit mode data represents the factory mode, the program advances to a step 39. Otherwise, the program advances to a step 40, which controls the on-screen device 16 and the television receiving circuit 11 so that the CRT 17 and other sections of the television receiver will be set into a normal mode of operation. After the step 40, the program returns to the step 34.

The step 39 decides whether or not an instruction signal for shipment setting is inputted from the input device 12. When an instruction signal for shipment setting is inputted from the input device 12, the program advances to a step 41. Otherwise, the program advances to a step 42.

The step 41 changes the 1-bit mode data in the nonvolatile memory 15 so that the 1-bit mode data will represent the normal mode. A step 43 following the step 41 changes the various information data and the reference data in the nonvolatile memory 15 so as to correspond to the normal mode. After the step 43, the program returns to the step 34.

The step 42 executes special factory-mode processes of checking and adjusting the television receiver. During the execution of the special factory-mode processes, electronic control volumes such a sound control volume and a brightness control volume in the television receiver can be varied at higher speeds than normal. A step 44 following the step 42 controls the on-screen device 16 so that a predetermined message or pattern representing the factory mode will be indicated on the CRT 17. After the step 44, the program returns to the step 34.

Figure 4:
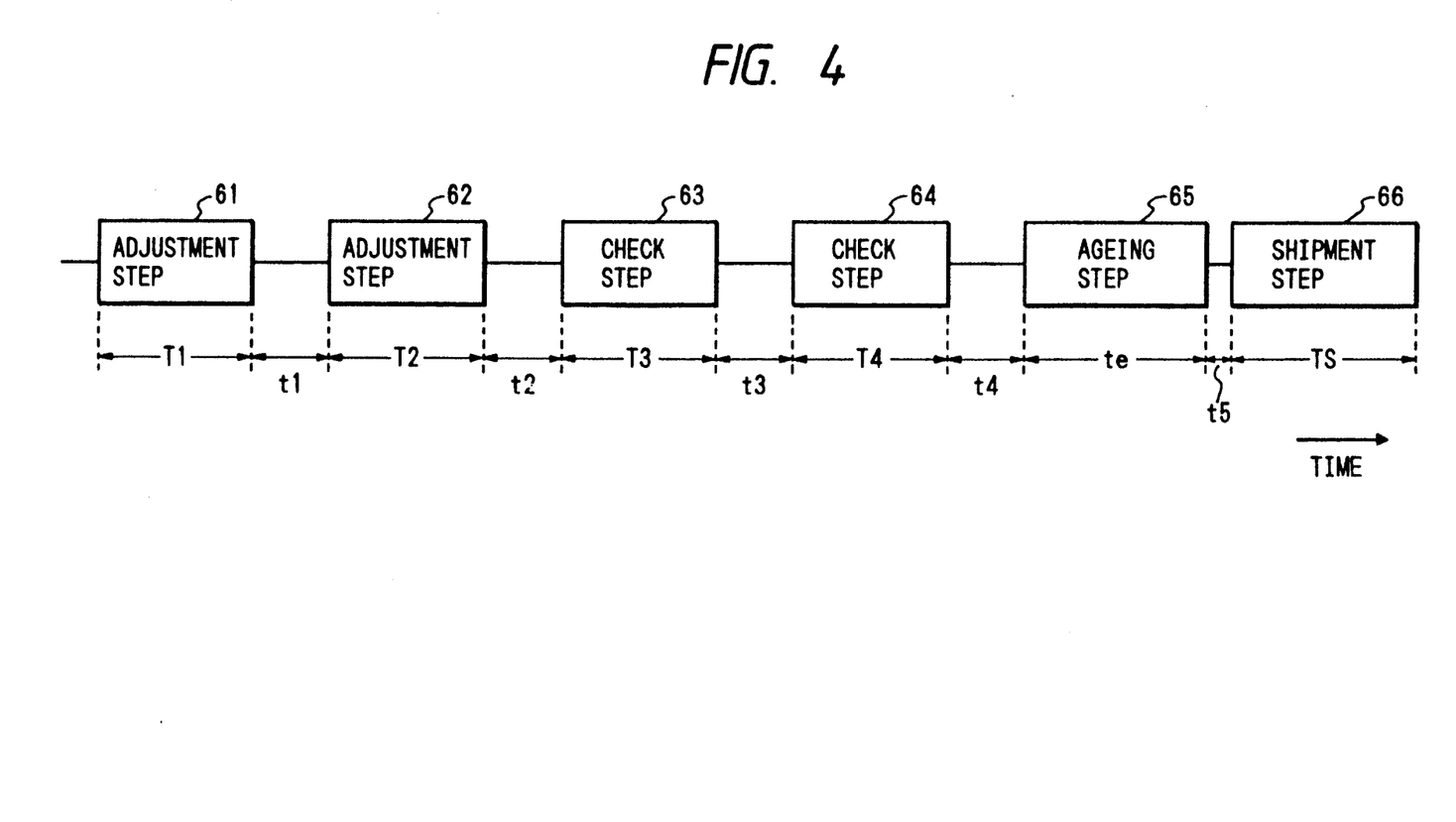
FIG. 4 is a time-domain diagram showing a sequence of steps in the production of a television receiver.
Figure 5:
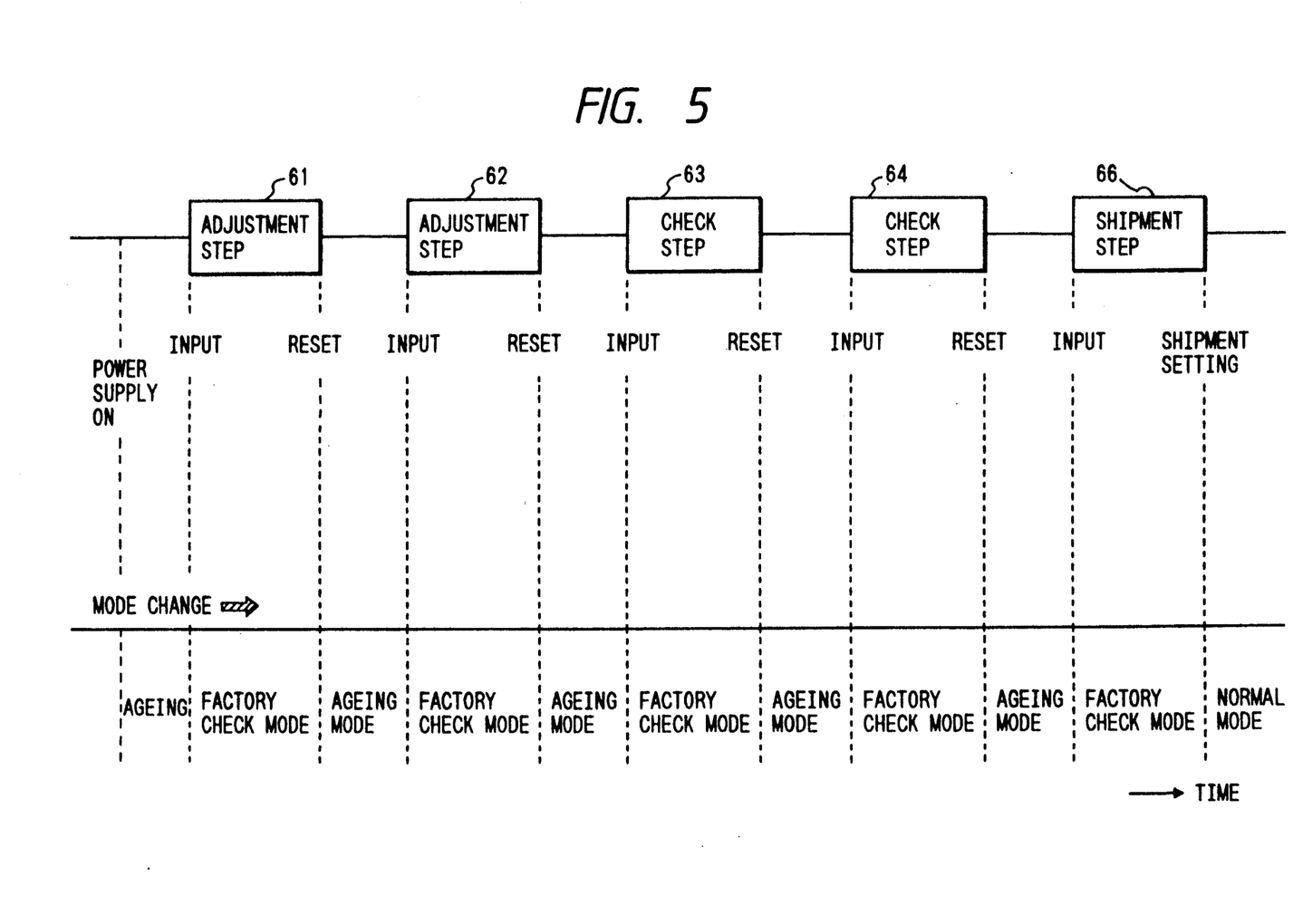
FIG. 5 is a time-domain diagram showing a sequence of steps in the production of a television receiver and modes of operation of the television receiver.
Figure 6:
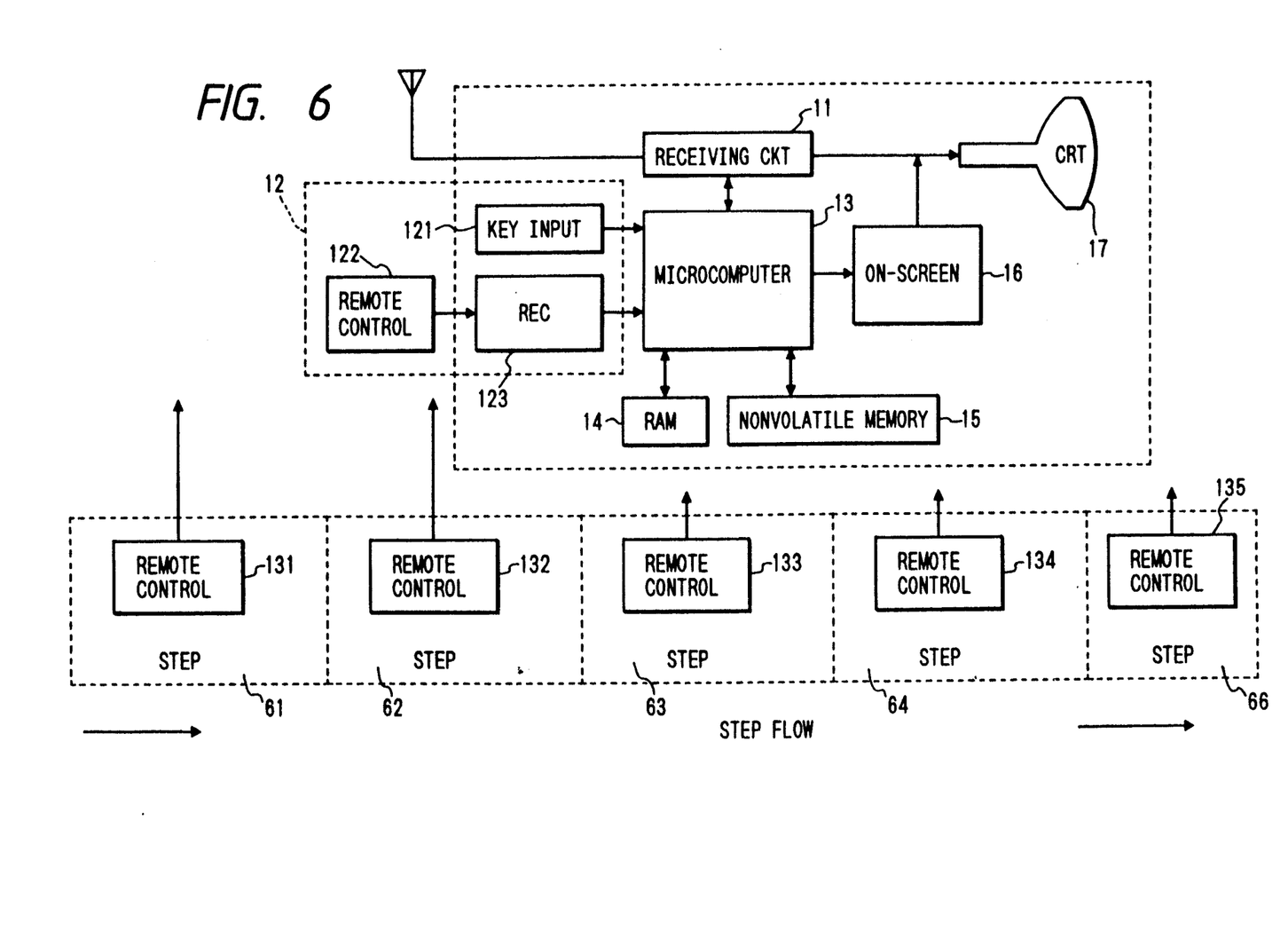
FIG. 6 is a diagram showing a television receiver and steps in the production of the television receiver.

As shown in FIG. 4, a final stage of the production of the television receiver includes various steps such as adjustment steps 61 and 62, check steps 63 and 64, an ageing step 65, and a shipment setting step 66. These steps 61–66 are sequentially executed. In the case where the production facilities of the factory are designed so as to reset the microcomputer when each of the steps 61–66 ends, the CRT 17 and other sections of the television receiver are automatically held in the ageing mode of operation by the step 33 of FIG. 3 during loss times between the steps 61–66. Furthermore, in the case where a desired ageing process is completed by the ageing operation in the loss times, the positive ageing step 65 can be removed as shown in FIG. 5. As shown in FIG. 6, the steps 61, 62, 63, 64, and 66 use respective remote-control transmitters 131, 132, 133, 134, and 135 in place of the remote-control transmitter 122.

What is claimed is:

1. A television receiver comprising:
    a receiving circuit having adjustment sections;
    control means for controlling the adjustment sections of the receiving circuit to adjust and check the adjustment sections of the receiving circuit;
    memory means for storing data determining control modes of the control means;
    input means for inputting a signal for designating the control-mode determining data in the memory means to control the adjustment sections of the receiving circuit; and display means for indicating information representing a designated control mode and also information representing results of adjustment by the control mode, further comprising:

mode setting means responsive to said input means for setting a factory check mode;

testing means operating during said factory check mode for testing a control system of the television receiver and responsiveness of the television receiver thereto, said testing means comprising means for increasing an operating speed of the adjustment sections of the television receiver, thereby to reduce a time required to identify proper responsiveness of the adjustment sections to control signals provided thereto.

2. The television receiver of claim 1 wherein the input means comprises a remote-control device and a key input device.

3. The television receiver of claim 1 wherein the memory means comprises a nonvolatile memory and a RAM, the nonvolatile memory storing factory check mode setting data for setting speeds of variation of the adjustment sections of the television receiver at predetermined speeds in said factory check mode which are higher than corresponding speeds in a normal mode, the nonvolatile memory storing normal mode setting data for setting the normal mode; and further comprising means for selectively transferring the factory check mode setting data and the normal mode setting data from the nonvolatile memory to the RAM, and means for enabling the display means to indicate information representing the selected mode.

4. The television receiver of claim 3, wherein said mode setting means further comprises means for changing the normal mode to a special mode, and means for enabling display means to indicate information representing the special mode when the normal mode is changed to the special mode.

5. The television receiver of claim 1, further comprising means for automatically setting the receiving circuit and the CRT into ageing states when the power supply is turned on, and means for setting the receiving circuit and the CRT out of the ageing states in response to a mode change signal.

6. A television receiver comprising:
a power supply;
a nonvolatile memory;
a RAM;
setting mode judgment means for transferring data from the nonvolatile memory to the RAM and judging whether or not a mode setting of the television receiver is a factory check mode on the basis of the transferred data when the power supply is turned on;
operating condition setting means for setting an operating condition in accordance with a result of the judging by the setting mode judgment means;
input signal judgment means for, after the operating condition setting means sets the operating condition, judging whether or not a control signal is inputted;
means for, in cases where the input signal judgment means judges that the control signal is not inputted, continuing a current mode;

a display device;
aging mode judgment means for, in cases where the input signal judgment means judges that the control signal is inputted, judging whether or not operation of the display device is in an aging mode;
changing means for, in cases where the ageing mode judgement means judges that the operation of the display device is in the ageing mode, replacing the ageing mode by the factory check mode;
factory check mode judgment means for, after the ageing mode judgment means judges whether or not the operation of the display device is in the ageing mode, judging whether the factory check mode or a normal mode is currently present;
shipment setting signal judgment means for, in cases where the factory check mode judgment means judges that the factory check mode is currently present, judging whether or not a shipment setting signal is inputted; and
means for, in cases where the shipment setting signal judgment means judges that the shipment setting signal is inputted, replacing the factory check mode by the normal mode.

7. A television receiver comprising:
a variable adjustment section which can operate in either a high-speed mode or a normal-speed mode, wherein a speed of a variation of the adjustment section in the high-speed mode of operation is higher than a speed of a variation of the adjustment section in the normal-speed mode of operation;
a nonvolatile memory for storing changeable mode data representing either the high-speed mode or the normal-speed mode;
means for deciding whether or not the mode data in the nonvolatile memory represents the high-speed mode; and
means for changing operation of the adjustment section between the high-speed mode and the normal-speed mode in response to a result of said deciding by said deciding means.

8. The television receiver of claim 7 further comprising means for detecting that a shipment setting signal is inputted, and means for setting the mode data in the nonvolatile memory so as to represent the normal mode when said detecting means detects that the shipment setting signal is inputted.

9. The television receiver of claim 7 further comprising means for indicating when the adjustment section operates in the high-speed mode.

10. A television receiver comprising:
a variable adjustment section which can operate in either a high-speed mode or a normal-speed mode, wherein a speed of a variation of the adjustment section in the high-speed mode of operation is higher than a speed of a variation of the adjustment section in the normal-speed mode of operation;
a nonvolatile memory for storing changeable mode data representing either the high-speed mode or the normal-speed mode, the mode data initially representing the high-speed mode;
means for initially setting operation of the adjustment section into the high-speed mode;
means for detecting whether or not a shipment setting signal is inputted;
means for changing the operation of the adjustment section from the high-speed mode to the normal-speed mode when said detecting means detects that a shipment setting signal is inputted;

means for changing the mode data in the nonvolatile memory so as to represent the normal-speed mode when said detecting means detects that a shipment setting signal is inputted;

means for deciding whether or not the mode data in the nonvolatile memory represents the high-speed mode; and means for continuing the normal-speed mode of the operation of the adjustment section when said deciding means decides that the mode data in the nonvolatile memory does not represent the high-speed mode.

* * * * *